(12) United States Patent
Mackie

(10) Patent No.: US 7,523,133 B2
(45) Date of Patent: Apr. 21, 2009

(54) DATA MODEL AND APPLICATIONS

(75) Inventor: Kevin Mackie, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 311 days.

(21) Appl. No.: 10/327,464

(22) Filed: Dec. 20, 2002

(65) Prior Publication Data

US 2004/0122826 A1   Jun. 24, 2004

(51) Int. Cl.
*G06F 17/30* (2006.01)
(52) U.S. Cl. .................. 707/104.1; 707/100; 707/101; 707/102; 707/103 R
(58) Field of Classification Search .................. 707/100, 707/104.1, 101–103 R; 705/1
See application file for complete search history.

(56) References Cited

U.S. PATENT DOCUMENTS

| | | | | |
|---|---|---|---|---|
| 6,253,208 B1 * | 6/2001 | Wittgreffe et al. | ........ | 707/104.1 |
| 6,460,043 B1 * | 10/2002 | Tabbara et al. | .............. | 707/100 |
| 2002/0133368 A1 * | 9/2002 | Strutt et al. | ..................... | 705/1 |
| 2003/0041045 A1 * | 2/2003 | Sun | ................................ | 707/1 |
| 2004/0034661 A1 * | 2/2004 | Barron et al. | ............ | 707/104.1 |
| 2004/0093526 A1 * | 5/2004 | Hirsch | ........................ | 713/202 |

* cited by examiner

*Primary Examiner*—Cam-Linh Nguyen
(74) *Attorney, Agent, or Firm*—Townsend and Townsend and Crew LLP (57) ABSTRACT

Systems and methods relating to a data model are described. The data model includes aspects of both static and dynamic data structures. In a typical implementation the dynamic data structures are used to store information whose organization and values may change responsive to the values of other data stored in the data model. The static data structures are used to store information whose structure and content are relatively more static. Tables within the static and dynamic data structures include a unique key configured to interrelate information stored in each data structure. The data model is illustrated using a customer relationship management (CRM) example. In this example, roles and relationships between business objects are stored in the dynamic data structures.

14 Claims, 5 Drawing Sheets

DATA MODEL AND APPLICATIONS

BACKGROUND

1. Field of the Invention

The invention is in the field of computing systems and more specifically in the field of data management.

2. Prior Art

The design and implementation of data systems can have a significant impact on the usefulness and versatility of stored data. Proper design includes specification of database keys, data tables and relationships between database entities. These elements and structures facilitate queries used to retrieve or summarize data. The development of specific database implementations often include consideration of tradeoffs between efficiency of data access and other factors such as duplication of information, model flexibility, data storage volume, and development of indexes. For example, division of data into multiple tables speeds access to each individual table but may slow operations involving data stored in different tables.

Since the development of the first relational data model a large number of variations have been implemented. These models can generally be classified as "static" or "dynamic." Static models include tables with fixed record length, fixed data types, and relationships between data records that do not depend on the actual data stored in each record. In contrast, dynamic models include data structures that may be responsive to individual data values, relationships between data or other properties. These data structures may also vary as stored data is modified.

Customer management and human resources are two applications that depend on data systems. A typical implementation in either application includes storage of information about people and organizations. For example, a person may be associated with a social security number, salary, supervisors, subordinates, purchasing authority, telephone number, e-mail address, and project group. Some of this information, such as social security number, may be preferably stored in a static data model while other information, such as a supervisor-subordinate relationships may be preferably stored in a dynamic data model.

Neither a static nor a dynamic data model is preferred for all types of data. There is, therefore, a need for improved data models better configured to store diverse data.

SUMMARY OF THE INVENTION

Embodiments of the invention include a data model that combines aspects of both static and dynamic data structures. This data model is applied to customer relationship management (CRM), human resource, and other applications. Tables within the static and dynamic data structures include a unique key configured to interrelate information stored in each data structure. The static data structure is configured to store static attributes associated with a business object (e.g., a person, organization or other data object), while the dynamic data structure is configured to store information defining roles and relationships between business objects. These relationships may include "supervisor-subordinate," "employer-employee," "supplier-customer," "group member-group," or the like.

An implementation of the invention is illustrated using an example data system configured for customer relation management. This example includes business objects such as people and organizations. Attributes of business objects, such as birth date, gender and taxpayer ID, are stored in a static data structure, while a dynamic data structure is used to store information characterizing relationships between the people and organizations. In some embodiments of the invention, data stored in the dynamic data structure is used in selecting data stored in the static data structure. For example, static contact information associated with a person is optionally selected using the person's dynamic relationship with a requesting business object.

Various embodiments of the invention include a data system comprising a static data structure configured to store a unique key and attributes of a business object, a dynamic data structure configured to store the business object and a role of the business object, the business object being referenced by the unique key, the role of the business object being responsive to a type of the business object, and metadata describing the type of the business object.

Various embodiments of the invention include a server system configured to support a data system, the data system comprising a static data structure configured to store a unique key and attributes of a business object, a dynamic data structure configured to store the business object, configured to store a role of the business object, and configured to store a relationship between the business object and another business object, the business object being characterized by the unique key, the role of the business object being responsive to a type of the business object, and the relationship being responsive to a type of the role of the business object, and metadata describing the type of the business object and the type of the role of the business object.

Various embodiments of the invention include a customer relation management system comprising dynamic data structure configured to store a relationship between business objects and further configured to store database keys configured to identify the business objects, static data structure configured to store other attributes of the business objects and further configured to store the database keys, the other attributes including an attribute of a person or an attribute of an organization, a data system including the dynamic data structure and the static data structure, and a server system configured for access via a client and configured to support the data system.

Various embodiments of the invention include a computer readable medium having embodied thereon data, the data including a customer relation management application comprising a data model configured to store a role of a person or organization in a dynamic data structure and to store an attribute of the person or organization in a static data structure, and a database key configured to relate data stored in the dynamic structure to data stored in the static structure.

Various embodiments of the invention include a method of adding a business object to a data system, the method comprising steps of receiving a request to add the business object, the business object configured to take a role, assigning a database key to the business object, determining a type of the business object, the type defined using metadata, the metadata configured to determine a type of the role of the business object, storing any static attributes of the business object in a static data structure, the static attributes being related to the business object by the database key, and storing any dynamic attributes of the business object in a dynamic data structure.

Various embodiments of the invention include a method of defining a role of a business object of a customer relation management system, the method comprising the steps of selecting the business object, the business object described by a business object type and characterized by a database key, selecting a role type of the role, the role type being responsive to the business object type, and defining dynamic data characterizing the role and responsive to the role type.

Various embodiments of the invention include a method of defining a relationship between a first business object and a second business object, the method comprising steps of selecting a relationship type, the relationship type being responsive to a role type of the first business object and responsive to a role type of the second business object, the role type of the first business object describing a role of the first business object and the rule type of the second business object describing a role of the second business object, and defining dynamic data characterizing the relationship and responsive to the relationship type.

Various embodiments of the invention include a method of determining a contact method between a first business object and a second business object, the determining method comprising identifying a first business object and a second business object, the first business object being of type person, identifying a relationship between the first business object and the second business object, determining a contact method purpose responsive to the relationship, and selecting a contact method using the contact method purpose.

Various embodiments of the invention include a server system comprising means for storing dynamic and static data and means for determining a contact method between a first business object and a second business object, the means including means for identifying a first business object and a second business object, the first business object being of type person, means for identifying a relationship between the first business object and the second business object, means for determining a contact method purpose responsive to the relationship, and means for selecting a contact method using the contact method purpose.

Various embodiments of the invention include a customer relation management system comprising means for selecting a business object, the business object described by a business object type and characterized by a database key, means for storing a static attribute of the business object in a static data structure, means for selecting a role type of a role of the business object, the role type being responsive to the business object type, and means for defining dynamic data characterizing the role and responsive to the role type.

DISCLOSURE OF THE INTENTION

The invention includes a mixed data model configured to include both static and dynamic data structures. The dynamic data structures are responsive to data stored in the mixed data model. For example, the value of one stored data element may determine a related dynamic data structure. The static and dynamic data structures are associated using one or more unique data keys.

The invention is optionally applied to a customer relationship management (CRM) system as described herein. This CRM application utilizes many of the features of the invention. For example, dynamic data structures are used to store information about roles and relationships between people while static data structures are used to store standard information about a person, such as their taxpayer identification number. Data structures used to store relationship information are responsive to data describing a person's role.

Figure 1:
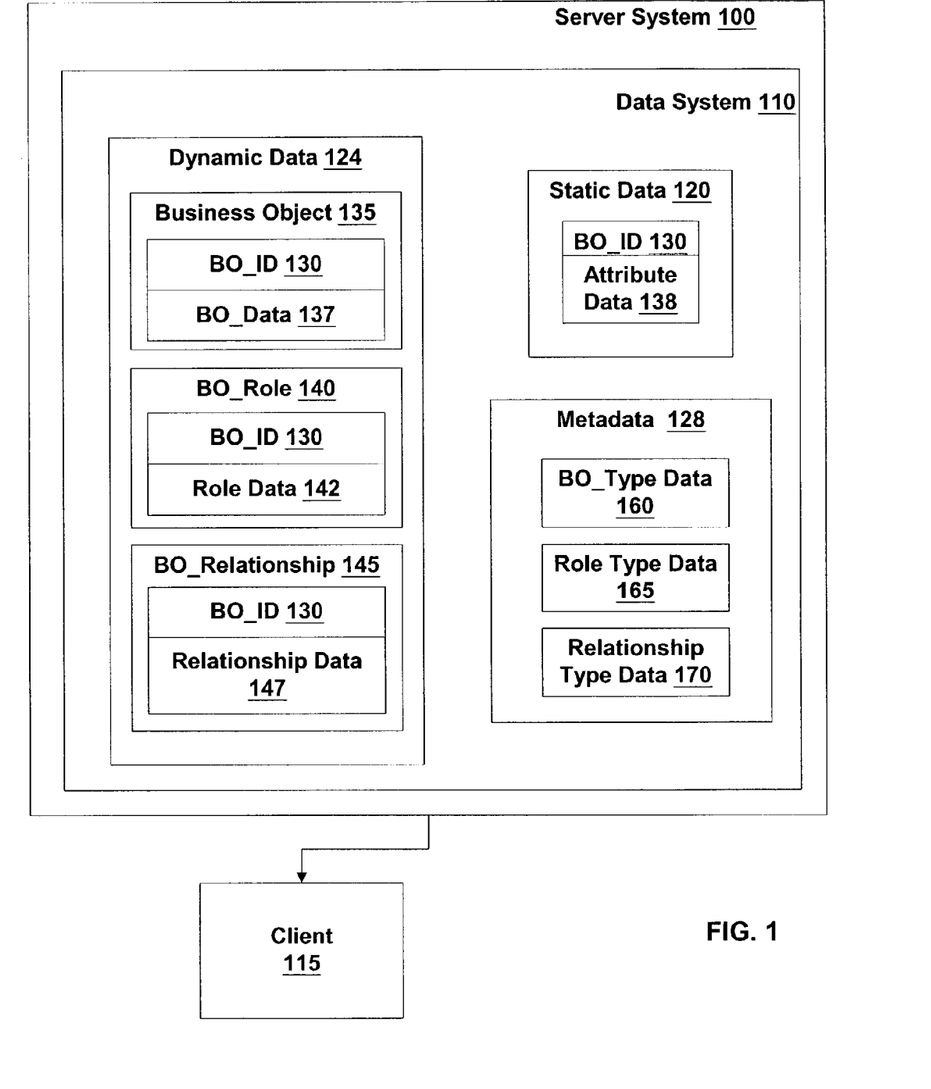
FIG. 1 illustrates a server system according to various embodiments of the invention.

FIG. 1 illustrates a Server System 100 according to various embodiments of the invention. Server System 100 includes one or more computing devices (e.g., data servers, file servers, network servers, routers, personal computers, or the like) configured to support a Data System 110 which is optionally configured as a relational database system. Server System 100, including Data System 110, are optionally accessible via a Client 115. Client 115 is a computing device such as a personal computer, personal digital assistant, terminal, network access device, or the like. Access to Server System 100 is optionally through a computer network such as a local area network, a wide area network, the Internet, or the like. Data System 110 is configured to store Static Data 120, Dynamic Data 124 and Metadata 128. Static Data 120 includes a business object identifier BO_ID 130 used to uniquely identify a Business Object 135 within the CRM application. Static Data 120 also optionally includes Attribute Data 138 characterizing specific static attributes of the identified Business Object 135. Each BO_ID 130 is a unique database key.

Dynamic Data 124 includes a dynamic data structure responsive to data values stored within Dynamic Data 124. For example, data fields within a data record may vary in response to a data value stored in other data records. As illustrated herein, the dynamic data structure is used to store information regarding roles of Business Object 135 and relationships between Business Objects 135. These aspects of Business Object 135 can vary significantly and are suited for storage in dynamic data structures. Dynamic Data 124 is related to Static Data 120 through BO_ID 130.

In some embodiments of the invention Dynamic Data 124 includes Business Object 135, one or more BO_Role 140 and one or more BO_Relationship 145. Each of these characteristics are indexed using BO_ID 130 and optionally include Role Data 142 and Relationship Data 147, characterizing BO_Role 140 and BO_Relationship 145 respectively. As described further in relationship to FIG. 2, BO_ID 130 identifies a specific Business Object 135, BO_Role 140 characterizes a role that Business Object 135 takes and BO_Relationship 145 characterizes a business object relationship between Business Object 135 and another Business Object 135 resulting from that role. Not every role requires associated relationships.

Dynamic Data 124 is typically defined by Metadata 128 which specifies allowed types, allowed roles, allowed relationships and other characteristics of a Business Object 135 identified by BO_ID 130. For example, in various embodiments, Metadata 128 includes BO_Type Data 160, Role Type Data 165 and Relationship Type Data 170. As described further herein, these data types are used to describe Business Object 135, BO_Role 140 and BO_Relationship 145, respectively. Metadata 128, therefore, characterizes roles that Business Object 135 is allowed to take and the relationships that they can have with other Business Objects 135.

Figure 2:
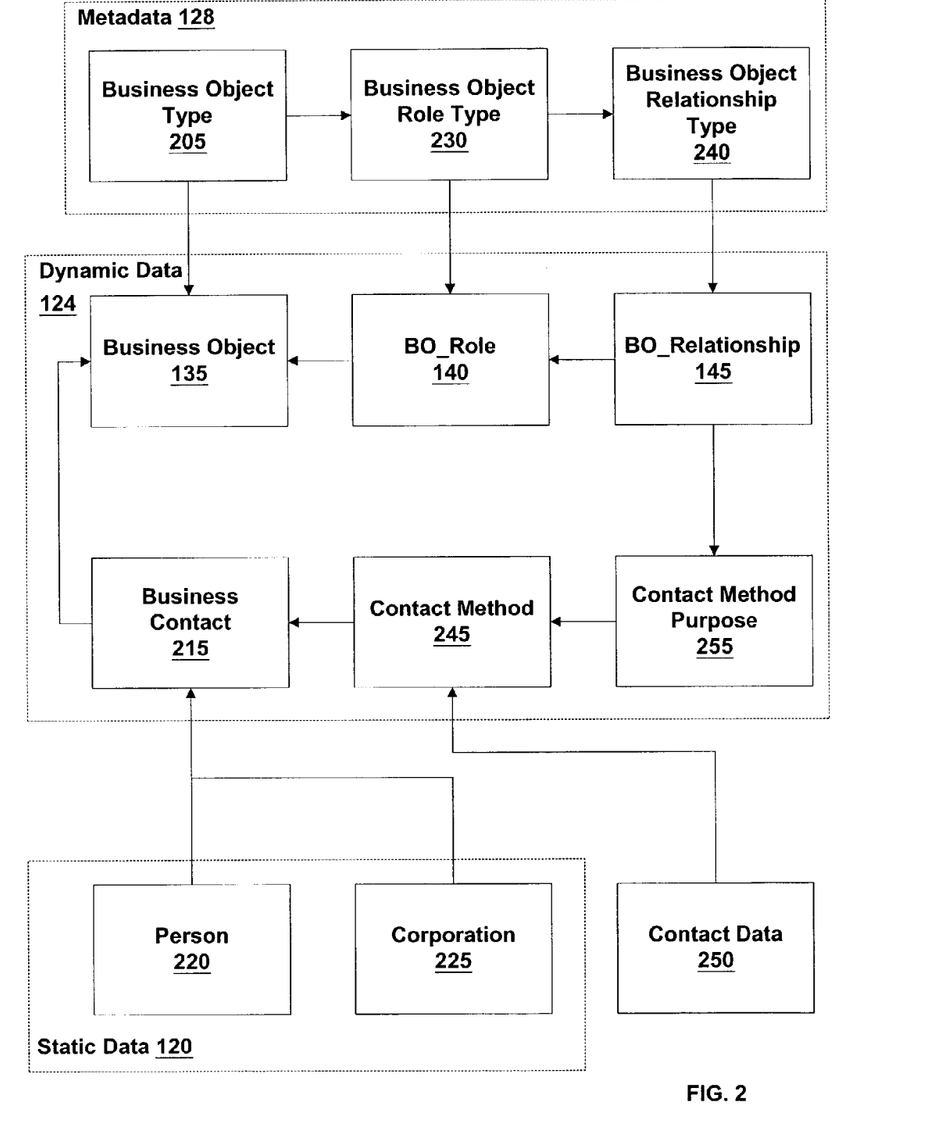
FIG. 2 is an entity relationship diagram according to various embodiments of the invention.

FIG. 2 is an entity relationship diagram showing data relationships in the CRM application according to various embodiments of the invention. In this example, Metadata 128 includes a Business Object Type 205 defined by BO_Type Data 160 (FIG. 1) and used to describe Business Object 135.

Business Object 135 is Dynamic Data 124 having optional attributes of a person, an organization, a process, a task, a purchase order, a transaction, and/or the like. These, and possibly other attributes discussed herein, are assigned to Business Object 135 through specification by a user or developer, inheritance from other elements of Data System 110, by default, or the like. In some embodiments, Business Object 135 inherits attributes of a Business Contact 215 which, in turn, inherits attributes of a Person 220 and/or a Corporation 225. Business Object 135, therefore, optionally has Business Object Type 205 of "business contact" and attributes of both a person and an organization. The Business Object Type 205 of Business Object 135 determines the BO_Role(s) 140 that Business Object 135 is allowed to take. BO_Role 140 is described by Business Object Role Type 230 which is defined by Role Type Data 165 (FIG. 1) and responsive to Business Object Type 205 and optionally other attributes of Business Object 135. For example, a Business Object 135, having static attributes of Person 220, may optionally have one or more BO_Role 140 such as "group leader," "purchasing manager," "engineer," "employee," "chief operating officer," "salesman," "contractor," or the like. For a Business Object 135 having attribute Corporation 225, typically a BO_Role 140 may include "manufacturer," "distributor," "consumer," "retailer," "wholesaler," or the like. Business Object 135 optionally takes more than one BO_Role 140.

Each BO_Role 140 is optionally further characterized by one or more BO_Relationship 145 that describe relationships that a Business Object 135 has with one or more other Business Object 135. For example, an instance of Business Object 135 having BO_Role 140 of "engineer," can have a BO_Relationship 145 of "subordinate-supervisor" with another instance of Business Object 135 having BO_Role 140 of "group leader." However, it is not typical for two instances of Business Object 135 having roles of "purchasing manager" and "manufacturer" to have a relationship of "subordinate." In some embodiments, such as those having Business Object Type 205 of process or task, relationships are optionally temporal and/or ordered (e.g., when one task must be completed before another task).

In some embodiments, the attribute Business Contact 215 is optionally associated with one or more attribute Contact Method 245 that include methods in which Business Object 135 can be contacted. When Business Object 135 has attributes of Person 220, these methods are typically, "work telephone," "mobile phone," "e-mail," "US mail," "Fax," or the like. Likewise, when Business Object 135 has attributes of Corporation 225, Contact Method 245 are typically "telephone," "e-mail," "US mail," "Fax," or the like. Each Contact Method 245 uses Contact Data 250 which includes data for using a Contact Method 245 such as "shipping address," "billing address," "e-mail address," "work telephone number," "Fax number," or the like. Contact Data 250 is either Static Data 120 or Dynamic Data 124. Each Content Method 245 is optionally used for one or more Contact Method Purpose 255. Contact Method Purpose 255 is dependant on a BO_Relationship 145 between the Business Object 135 making contact and the Business Object 135 receiving contact. For example, in some embodiments, wherein the relationship between two Business Object 135 is a "supplier-customer" relationship, Contact Method Purpose 255 includes "place purchase order" or "pay invoice." As discussed further herein, this data structure enables selection of a Contact Method 245 and Contact Data 250 based on BO_Relationship 145.

In the embodiments illustrated by FIG. 2, Static Data 120 includes Person 220 and Corporation 225. These are each typically data tables including static data records with fields such as "taxpayer ID," "name," "stock symbol," "birth date," or the like. Person 220 and Corporation 225 each include a data field configured to store the unique business object identifier BO_ID 130, which is configured to associate Static Data 120 with Dynamic Data 124. In some embodiments Static Data 120 includes part of a pre-existing database to which BO_ID 130 and Dynamic Data 124 have been added to develop a Data System 110 according to an embodiment of the invention.

Figure 3:
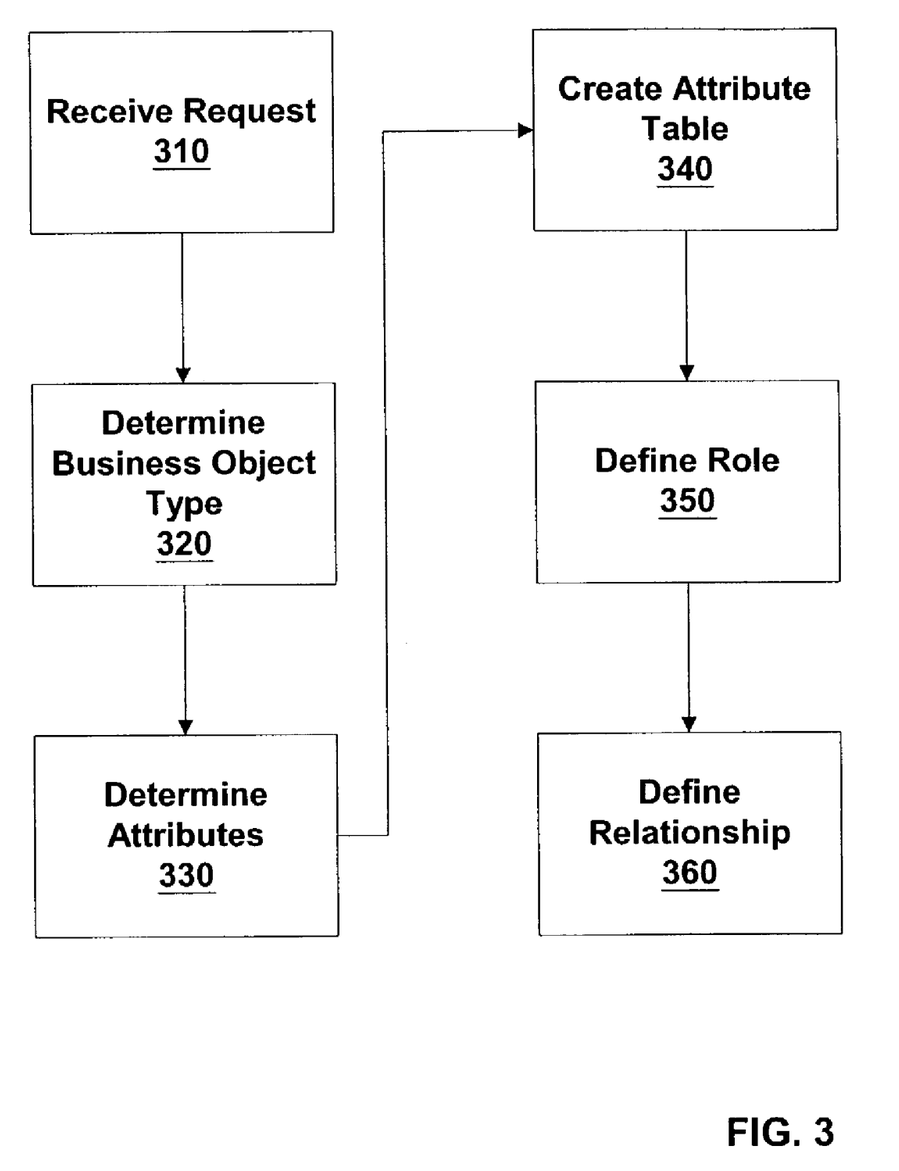
FIG. 3 illustrates a method of adding a new business object to a data system according to various embodiments of the invention.

FIG. 3 illustrates a method of adding a new Business Object 135 to a Data System 110 according to various embodiments of the invention. In this method, both Dynamic Data 124 and Static Data 120 are optionally defined in relation to the added Business Object 135.

In a Receive Request Step 310, Server System 100 receives a request to store a new Business Object 135 in Data System 110. Receive Request Step 310 is optionally initiated by user data entered through a browser based interface, by a parent application configured to use Server System 100 for information storage, by a configuration process designed to develop Data System 110, or the like. After a request is received a new unique database key BO_ID 130 is assigned to the new Business Object 135. Thereafter, Business Object 135 and associated data are optionally referenced using BO_ID 130.

In a Determine Business Object Type Step 320, a Business Object Type 205 is selected to describe the new Business Object 135. The selected Business Object Type 205 determines roles that Business Object 135 can take and attributes that it can have. For example, if Business Object 135 is of Business Object Type 205 "person" then it is optionally only allowed to take a BO_Role 140 that a "person" can take. Similarly, if Business Object 135 is of type "process" then it typically takes those BO_Role 140 that a "process" can take. Other Business Object Type 205 have analogous rules used to determine BO_Role 140. In one embodiment, determination of the Business Object Type 205 is responsive to a type selected by a user. In another embodiment, determination is responsive to attributes or relationships used to define Business Object 135 before or during its inclusion in Data System 110. For example, a Business Object 135 inheriting an attribute "birth date" or relationship "employee" optionally defaults to a Business Object Type 205 of "person." In other embodiments, determination of Business Object Type 205, describing the new Business Object 135, is responsive to an identity of Data System 110, an independent process or application program, an other Business Object 135, or the like.

After a Business Object Type 205 is determined, further attributes and roles of Business Object 135 are optionally defined. For example, in an optional Determine Attributes Step 330, dynamic and/or static attributes of Business Object 135 are associated with Business Object 135. In some embodiments, these attributes include those of Business Contact 215 and Person 220 as illustrated in FIG. 2. Thus, in Step 330, Business Object 135 may be associated with static attributes of "name" and "gender," and may be associated with dynamic attributes such as "mobile telephone number."

In an optional Create Attribute Table Step 340, one or more data tables configured to store the attributes determined in Step 330 are created and/or populated with data. These tables are included in Dynamic Data 124 or Static Data 120 and include fields to store BO_ID 130, associating data records with the new Business Object 135. In Create Attribute Table Step 340, any dynamic and any static attributes of the new Business Object 135, determined in step 330, are stored in the data tables. Some of these attributes are optionally inherited from defined type such as Person 220 or Corporation 225.

In an optional Define Role Step 350 one or more BO_Role 140 is specified with respect to Business Object 135. The specified BO_Role 140 is characterized by Business Object Role Type 230 and thus, in part, is determined by Business Object Type 205 (and optionally other attributes) of Business Object 135. For example, in one embodiment of the CRM application illustrated in FIG. 2, Business Object 135 has a Business Object Type 205 of "person" and, therefore, has attributes Person 220. This Business Object Type 205 allows BO_Role 140 to be of a Business Object Role Type 230 that can be held by a "person." Thus, in this example, the BO_Role 140, defined in Define Role Step 350, can be of type "supervisor" but not type of type "subsidiary."

When at least one BO_Role 140 is associated with Business Object 135, BO_Relationship 145 between the Business Object 135 and other Business Object 135 is optionally specified in a Define Relationship Step 360. The specified BO_Relationship 145 is described by Business Object Relationship Type 240 which is defined by Relationship Type Data 170, and responsive to BO_Role 140, Business Object Type 205 and optionally other attributes of Business Object 135. For example, a Business Object 135 having BO_Role 140 of manufacturer will normally not have a relationship of "employee" with a Business Object 135 of type "process." Rather, "employer-employee" relationships typically occur between a first and second Business Object 135 having roles of "employer" and "employee," respectively. This rule and other rules regarding allowed BO_Role 140 and BO_Relationship 145 are found in Metadata 128.

Steps 330, 340, 350 and/or 360 may be performed at the time Business Object 135 is added to Data System 110 or at a later time. For example, Business Object 135 is optionally associated with more than one BO_Role 140, each specified at a different time. For example, a person may have BO_Roles 140 of "supervisor" and "employee." At a later time, an additional role of "purchasing manager" may be added as the person is promoted. Each of these BO_Roles 140 optionally includes a different and/or independent set of criteria used to determine allowed BO_Relationship 145.

Figure 4:
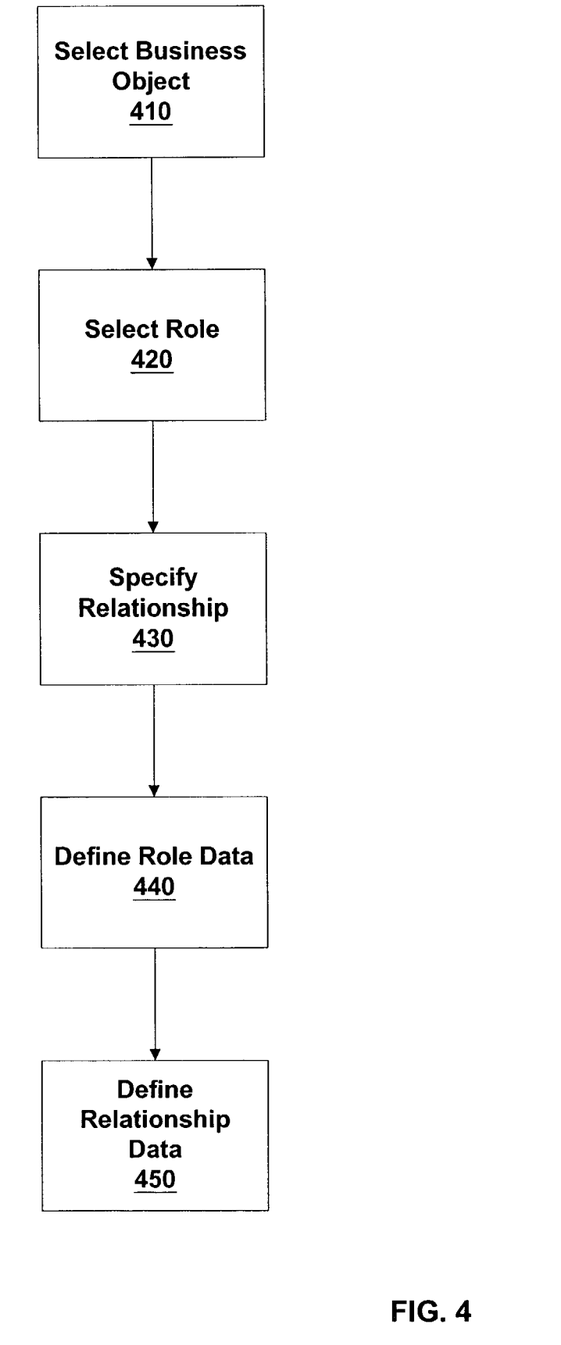
FIG. 4 illustrates a method of associating a new role with an existing business object, according to various embodiments of the invention.

As illustrated in FIG. 4, an existing Business Object 135 may be associated with a new BO_Role 140. Each BO_Role 140 and BO_Relationship 145 is, typically, characterized by Role Data 142 and Relationship Data 147. In a Select Business Object Step 410, a Business Object 135 is selected for association. The selected Business Object 135 is either a new or previously existing Business Object 135 and is described by a Business Object Type 205.

In a Select Role Step 420 a new BO_Role 140 is selected for association with Business Object 135. The new BO_Role 140 is described by Business Object Role Type 230 which is responsive to the Business Object Type 205 describing Business Object 135. Thus, the BO_Roles 140 available for association with Business Object 135 are determined, in part, by Business Object Type 205 and optionally other attributes of Business Object 135. In an optional Specify Relationship Step 430, one or more BO_Relationship 145 is specified for association with the BO_Role 140 selected in Step 420. This BO_Relationship 145 will be a relationship between the Business Object 135 selected in Select Business Object 410 and another Business Object 135. The BO_Relationship 145 available for specification in Step 420, is of the one or more Business Object Relationship Type 240 allowed by Business Object Role Type 230.

In an optional Define Role Data Step 440, Role Data 142, further characterizing BO_Role 140, is specified. Data 142 includes data such as a role name, start date, end date, budget, or the like. In an optional Define Relationship Data Step 450, Relationship Data 147, further characterizing BO_Relationship 145, is specified. Relationship Data 147 includes a BO_ID 130 and a BO_Role 140 for each of the participants in the BO_Relationship 145. In some embodiments, Relationship Data 147 also includes a relationship identifier, time limits, limits on the number of participants in each role, hierarchical information relating to participants, or the like.

The method illustrated by FIG. 4 is optionally adapted to addition of a new BO_Relationship 145 to an existing BO_Role 140. In some embodiments, a preexisting BO_Role 140 is selected in Select Role Step 420. The selected BO_Role 140 is associated with new BO_Relationship 145 in Specify Relationship Step 430 and data further defining this BO_Relationship 145 is optionally defined in Define Relationship Data Step 450.

Figure 5:
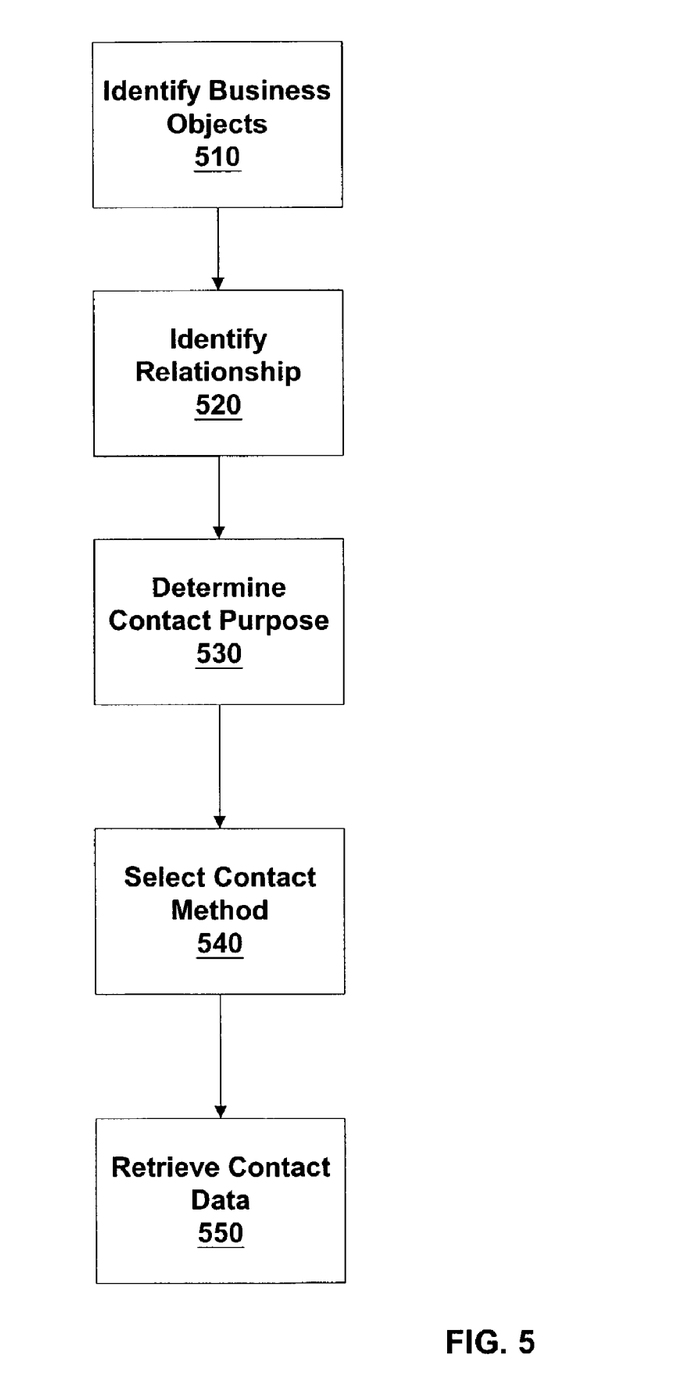
FIG. 5 illustrates a method of determining an appropriate contact method for communication between two business objects, according to various embodiments of the invention.

FIG. 5 illustrates a method of determining an appropriate contact method for a communication between two Business Object 135, according to various embodiments of the invention. This method uses BO_Relationship 145 to determine Contact Method Purpose 255 and select a Contact Method 245 accordingly. Contact Data 250 is retrieved responsive to the selected Contact Method 245.

In an Identify Business Objects Step 510 at least one sending and at least one receiving Business Object 135, involved in the communication, are identified. There are optionally more than one sender and/or receiver in each communication. Each of these Business Object 135 is uniquely identified using its BO_ID 130.

In an Identify Relationship Step 520, one or more BO_Relationship 145 involving at least one of the sending and at least one of the receiving Business Object 135 are identified. Step 520 typically includes execution of a query of Dynamic Data 124 using appropriate BO_ID 130 as parameters. The one or more identified BO_Relationship 145 is used, in Determine Contract Purpose Step 530, to compile a set of possible Contact Method Purpose 255 for the communication. For example, in one embodiment, when a manufacturer contacts a retailer, a "manufacturer-retailer" relationship indicates Contact Method Purposes 255 of "ship product," "send account statement," or the like. In contrast, when an employer contacts an employee, a "employer-employee" relationship may indicate a Contact Method Purpose 140 of "pay salary," "promote," "terminate," or the like.

Each Contact Method Purpose 255 is associated with one or more Contact Method 245. Thus, in a Select Contact Method Step 540, the Contact Method Purposes 255 determined in Step 530 are optionally used to determine one or more Contact Method 245 available for selection with regard to the communication. For example, during the execution of one embodiment of Step 540, a Business Object 135 requesting communication with another Business Object 135 selects one or more Contact Method 245 from a set of Contact Method 245. This set includes those Contact Method 245 associated with members of the set of Contact Method Purpose 255 determined in Step 530.

In a Retrieve Contact Data Step 550, Contact Data 250, associated with the selected Contact Method 245 selected in Step 540, is retrieved. For example, in one embodiment, a Contact Method Purpose 140 of "pay salary" results in Contact Methods 245 set including "wire-transfer," "US mail," or "Hand Delivery." In this example, a bank routing and account number, postal address, or office number, respectively, is retrieved from Contact Data 250. The Contact Method 245 list is optionally further responsive to other data, such as Static Data 120, predefined preference, day of the week, vacation schedule, or the like.

Several embodiments are specifically illustrated and/or described herein. However, it will be appreciated that modifications and variations are covered by the above teachings and within the scope of the appended claims without departing from the spirit and intended scope thereof.

I claim:

1. A method for storing data for access by an application program being executed on a data processing system, comprising:

storing in a first table a unique business object identifier and attribute data characterizing static attributes of a business object identified by the unique business object identifier, wherein the first table is a static data structure, and whereby an entity relationship model is implemented by the static data structure;

varying data fields within each data record of the dynamic data structure in response to a data value stored in another data record, the dynamic data structure being configured to implement the entity relationship model by storing in a second table a role of the business object, wherein the second table is a dynamic data structure having data fields within each data record of the second table which is variable in response to the data value stored in another data record, whereby the entity relationship model is implemented by the dynamic data structure, the business object being identified by the unique business object identifier in the static data structure, the role being indexed by the unique business object identifier in the static data structure, the role of the business object being responsive to a type of the business object;

determining at least one relationship between the business object and another business object and storing the at least one relationship in the second table; and specifying in metadata an allowed type of the business object, an allowed role for the business object, and an allowed relationship for the business object, whereby the entity relationship model is implemented by the metadata.

2. The method of claim 1, wherein the at least one relationship being responsive to a type of the role of the business object.

3. The method of claim 2, wherein the type of the business object is a person or an organization.

4. The method of claim 2, wherein the business object has attributes of contact method.

5. The method of claim 4, wherein the contact method is configured for selection responsive to the relationship between the business object and another business object.

6. The method of claim 2, wherein the relationship between the business object and another business object is temporal.

7. The method of claim 1, wherein the type of the business object is of a business object type selected from a group consisting of a person, an organization, a purchase order, a task, a process and a transaction.

8. A computer program product stored on a computer-readable medium configured to store code operational by a processor of a computer system for storing data for access by an application program being executed on a data processing system, the computer program product comprising:

code for storing in a first table a unique business object identifier and attribute data characterizing static attributes of a business object identified by the unique business object identifier, wherein the first table is a static data structure, and whereby an entity relationship model is implemented by the static data structure;

code for varying data fields within each data record of the dynamic data structure in response to a data value stored in another data record, the dynamic data structure being configured to implement the entity relationship model by storing in a second table a role of the business object, wherein the second table is a dynamic data structure having data fields within each data record of the second table which is variable in response to a data value stored in another data record, whereby the entity relationship model is implemented by the dynamic data structure, the business object being identified by the unique business object identifier in the static data structure, the role being indexed by the unique business object identifier in the static data structure, the role of the business object being responsive to a type of the business object, and the relationship being responsive to a type of the role of the business object;

code for determining at least one relationship between the business object and another business object and storing the at least one relationship in the second table; and code for specifying in metadata an allowed type of the business object, an allowed role for the business object, and an allowed relationship for the business object, whereby the entity relationship model is implemented by the metadata.

9. The computer program product of claim 8, wherein the relationship between the business object and another business object is configured to determine a contact method purpose.

10. The computer program product of claim 9, wherein the business object includes a contact method attribute, the contact method attribute configured for selection using the contact method purpose.

11. A customer relation management system for storing data for access by an application program being executed on a data processing system, the customer relation management system comprising:

a processor; and a memory coupled to the processor, wherein the memory is configured to store a plurality of code modules which when executed by the processor cause the processor to:

implement an entity relationship model by storing in a first table a unique business object identifier and attribute data characterizing static attributes of a business object identified by the unique business object identifier, wherein the first table is a static data structure;

vary data fields within each data record of the dynamic data structure in response to a data value stored in another data record, the dynamic data structure being configured to implement the entity relationship model by storing in a second table a role of the business object, wherein the second table is a dynamic data structure having data fields within each data record of the second table which is variable in response to the data value stored in another data record, whereby the entity relationship model is implemented by the dynamic data structure, the business object being identified by the unique business object identifier in the static data structure, the role being indexed by the unique business object identifier in the static data structure, the role of the business object being responsive to a type of the business object, and the relationship being responsive to a type of the role of the business object;

determine at least one relationship between the business object and another business object and store the at least one relationship in the second table; and specifying in metadata an allowed type of the business object, an allowed role for the business object, and an allowed relationship for the identified business object, whereby the entity relationship model is implemented by the metadata.

12. The customer relation management system of claim 11, further including a contact method configured for selection responsive to the relationship between business objects.

13. The customer relation management system of claim 11, wherein at least one of the business objects has attributes of a person.

14. The customer relation management system of claim 11, wherein at least one of the business objects is of a type task or is of a type process.

* * * * *

UNITED STATES PATENT AND TRADEMARK OFFICE
CERTIFICATE OF CORRECTION

| | | |
|---|---|---|
| PATENT NO. | : 7,523,133 B2 | Page 1 of 1 |
| APPLICATION NO. | : 10/327464 | |
| DATED | : April 21, 2009 | |
| INVENTOR(S) | : Mackie | |

It is certified that error appears in the above-identified patent and that said Letters Patent is hereby corrected as shown below:

In column 11, line 3, in claim 11, before "business" delete "identified".

Signed and Sealed this

First Day of June, 2010

David J. Kappos
*Director of the United States Patent and Trademark Office*